Jan. 3, 1928.
A. L. BETTS
1,654,630
TANK VALVE MECHANISM
Filed March 7, 1924    2 Sheets-Sheet 2
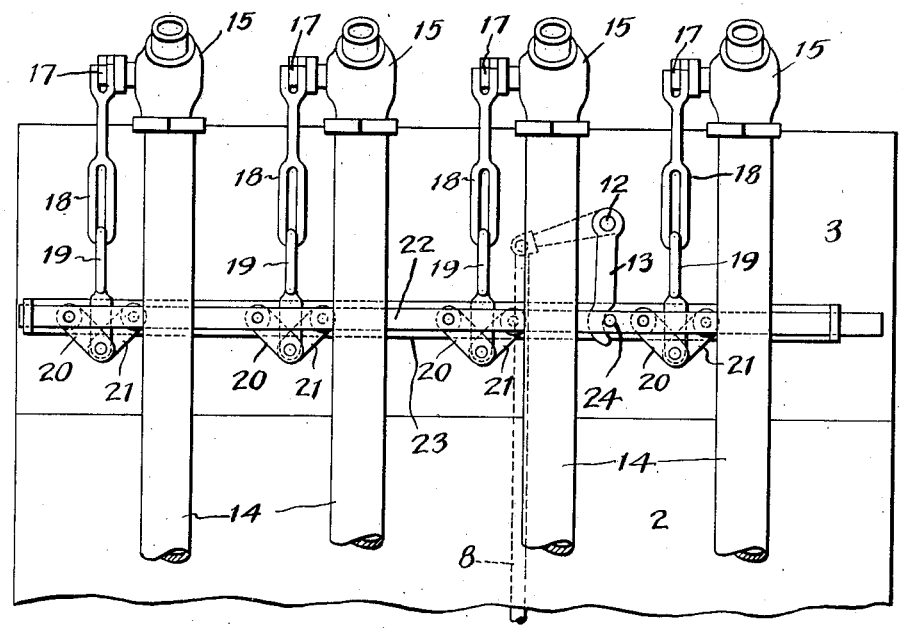
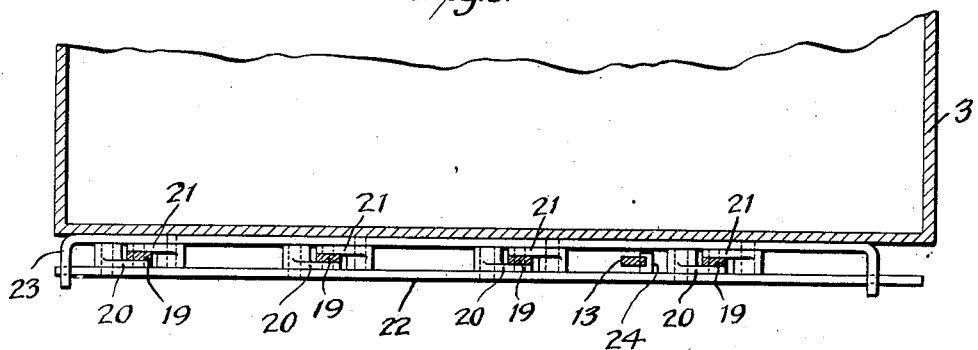

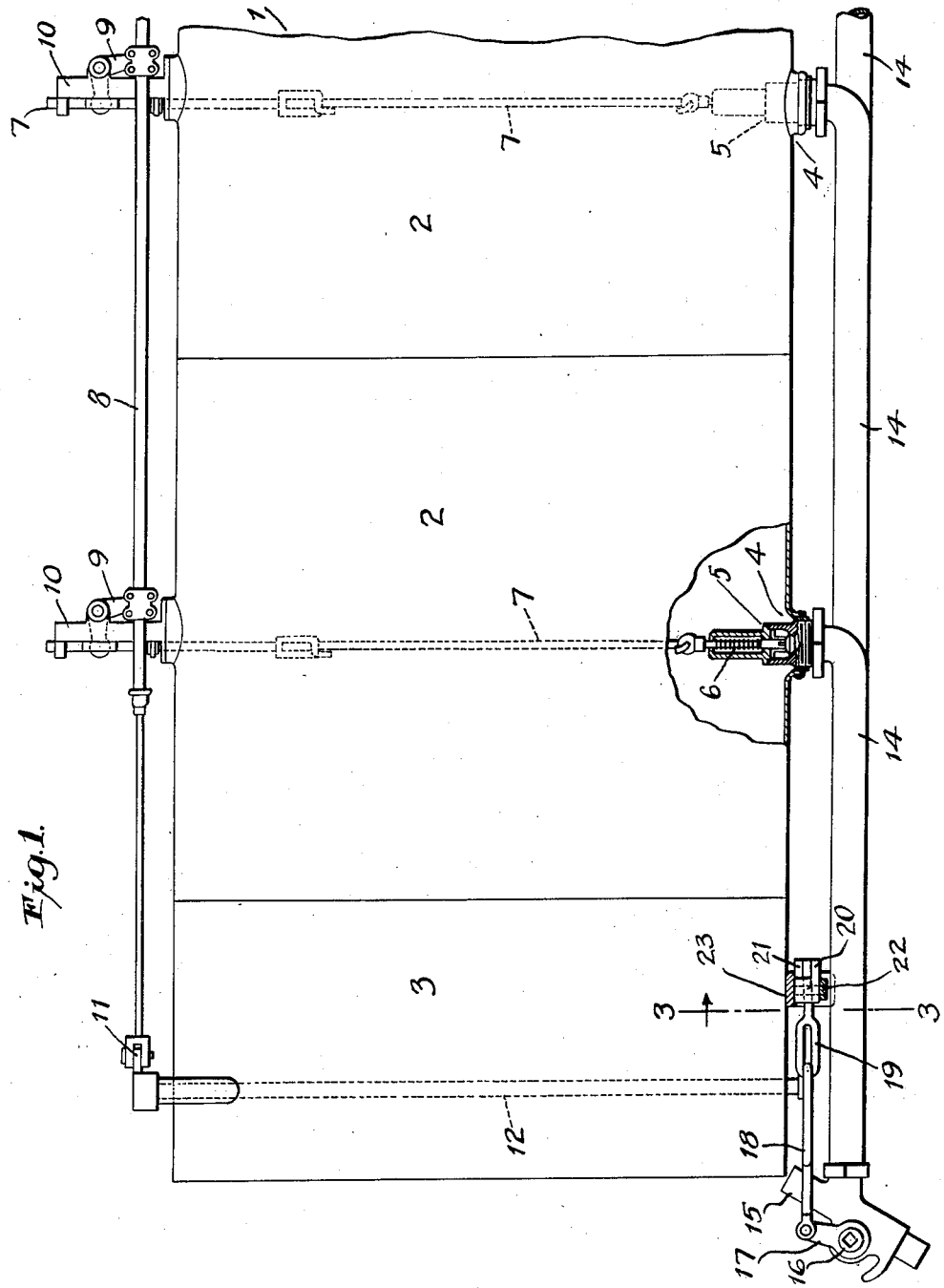

Patented Jan. 3, 1928.

1,654,630

UNITED STATES PATENT OFFICE.

ARTHUR L. BETTS, OF CINCINNATI, OHIO, ASSIGNOR TO AUGUSTINE DAVIS, JR., OF COVINGTON, KENTUCKY.

TANK VALVE MECHANISM.

Application filed March 7, 1924. Serial No. 697,580.

The invention relates particularly to means for operating the so-called emergency valves of truck tanks. These emergency valves are valves for closing the bottom outlets of the tank compartments to prevent liquid passing to the piping of the delivery faucets, in case of a break or leak occurring in the faucets or pipes. These valves should be operated often enough to keep them in good working order, and it is desirable that they be kept closed, except when oil or gasoline is being delivered.

It has been proposed to connect the faucets with the emergency valves by connections running through the pipes, but such a plan obstructs the flow. The subject of the present invention is an external linkage or mechanical operating train interposed between the faucets and the emergency valves, the construction being specifically one in which the valves of all the compartments of a tank are operated through a universal bar with the operation of any one of the faucets. The invention as herein disclosed is applicable to existing kinds of emergency valve mechanism.

In the accompanying drawing forming part hereof:

Fig. 1 is a side elevation of part of a plural-compartment vehicle-tank having the invention applied thereto, a portion of the tank being broken away to reveal one of the emergency valves in vertical section;

Fig. 2 is a bottom plan at the rear of the tank; and

Fig. 3 is a section on the line 3—3 of Fig. 1.

The tank 1 comprises a plurality of separate compartments 2, two of these compartments being represented in Fig. 1. At the rear end of the tank there may be a customary bucket-box 3. The bottom outlet 4 of each of the compartments is commanded by a shut-off valve 5 closed by a spring 6. These valves are adapted to be unseated by articulated pull-rod connections 7 passing upward through the interior of the tank and through the top. These pull-rods form part of a common operating mechanism for the several valves, which includes a longitudinal operating rod 8 passing lengthwise over the top of the tank and related to the respective pull-rod bell-cranks 9 fulcrumed in brackets 10. The rod 8 is connected at its rear end at 11 to an arm of a vertical rock-shaft 12, which passes downward through the bucket-box 3, the lower end of this rock-shaft being provided with an arm 13. Pipes 14 lead from the several bottom outlets rearward beneath the tank and bucket-box, and terminate in faucets 15. These faucets are adapted to be opened by a separate wrench-handle, not shown, applied to sockets in the portions 16 of the faucets which turn to open the faucet valves. Since these faucets may be of standard type, special illustration thereof is unnecessary.

As a means of operatively connecting or relating the faucets to the emergency valve mechanism, the turn portions of the faucets are represented as being provided with crank arms 17, to which are pivoted forwardly extending pull links 18, each of these links having a slotted or one-way-acting operating connection with a further link 19, which is pivoted to the joint between a pair of toggle links 20, 21. In each of these toggles the link 20 is pivoted to a universal sliding bar 22, while the link 21 is pivoted to the bucket-box or other fixed support. The bar 22 extends transversely beneath the bucket-box in a suitable guide 23, and has a pin 24 to bear against the arm 13 of the rock-shaft 12.

The faucets and emergency valves are all normally closed. When any one of the faucets is opened, the corresponding links 18, 19 are drawn rearward, thereby acting upon the corresponding toggle 20, 21 to shift the universal bar 22 in the direction to actuate the arm 13, so as to operate the common mechanism, comprising the rock-shaft 12 and the overhead rod 8, so as to operate the branches 7 of all the emergency valves, opening them against the resistance of their springs. Thus, frequent operation of the emergency valves is secured. The other faucets are not affected by the opening of one of the faucets, because, while all the toggles and links 20, 21 and 19 are operated, the links 19, corresponding to the faucets which remain closed, move idly with respect to the corresponding links 18. Naturally, other forms of one-way-operating connections between the faucets and the universal bar may be employed.

When the faucet which was opened is closed, or is permitted to close under the action of its spring, if it be a spring faucet, the springs connected with the emergency valves and their pull-rod connections 7 close all the emergency valves and restore the valve-operating mechanism including the universal bar 22 to normal position.

While the preferred form of the invention has been described, I wish it to be understood that I do not limit myself to the precise details, and that there may be numerous changes without departing from essentials.

What I claim as new is:

1. In a tank comprising a plurality of compartments having bottom outlets, valves commanding said outlets and faucets connected with the outlets, of a common mechanical operating means having portions to act upon the several outlet valves, and a universal bar operatable by any of the faucets to actuate said common operating means.

2. In a tank comprising a plurality of compartments having bottom outlets, valves commanding said outlets and faucets connected with the outlets, of a common mechanical operating means having portions to act upon the several outlet valves, a universal bar operatively connected with said common operating means, said bar operating in the direction of its length, and linkages operatively related to the several faucets and to the universal bar, in such manner that operation of any one of the faucets operates the universal bar but operation of the bar does not act upon any other of the faucets.

3. In a tank comprising a plurality of compartments having bottom outlets, valves commanding said outlets and faucets connected with the outlets, of a common mechanical operating means having portions to act upon the several outlet valves, a universal bar operatively connected with said common operating means, said bar operating in the direction of its length, and toggle linkages operatively related to the several faucets and to the universal bar, in such manner that operation of any one of the faucets operates the universal bar but operation of the bar does not act upon any other of the faucets.

4. In a vehicle tank comprising a plurality of separate chambers, each having an outlet, the combination of shut-off valves associated with the several compartments commanding the outlets, external pipes connected with the several outlets, valves in the several pipes, parts above the top of the tank connected with the several shut-off valves, a control rod extending lengthwise of the tank to cooperate with said several parts, and operative connections between said control rod and the external pipe valves.

5. In a vehicle tank comprising a plurality of separate chambers, each having an outlet, the combination of shut-off valves associated with the several compartments commanding the outlets, external pipes connected with the several outlets, valves in the several pipes, parts connected with the several shut-off valves for operating the same, a common member, operative connections between said common member and said parts, and operative connections between said common member and the external pipe valves.

ARTHUR L. BETTS.